Sept. 20, 1966        R. W. SCHUFF        3,273,861
PRECISION POSITIONING DEVICE
Filed July 6, 1964                3 Sheets-Sheet 1
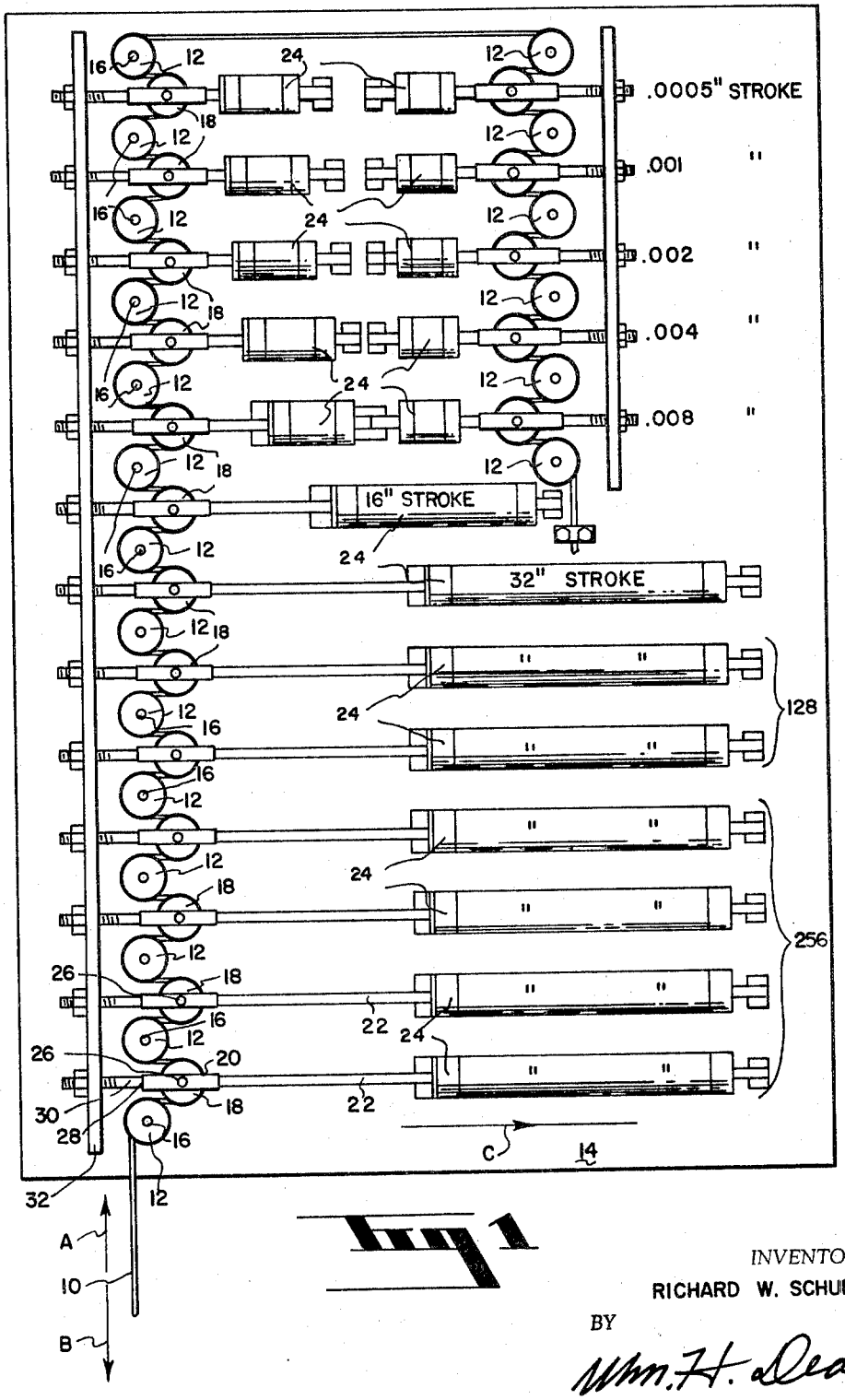
INVENTOR.
RICHARD W. SCHUFF
BY
Wm. H. Dean Sept. 20, 1966 R. W. SCHUFF 3,273,861
PRECISION POSITIONING DEVICE
Filed July 6, 1964 3 Sheets-Sheet 2
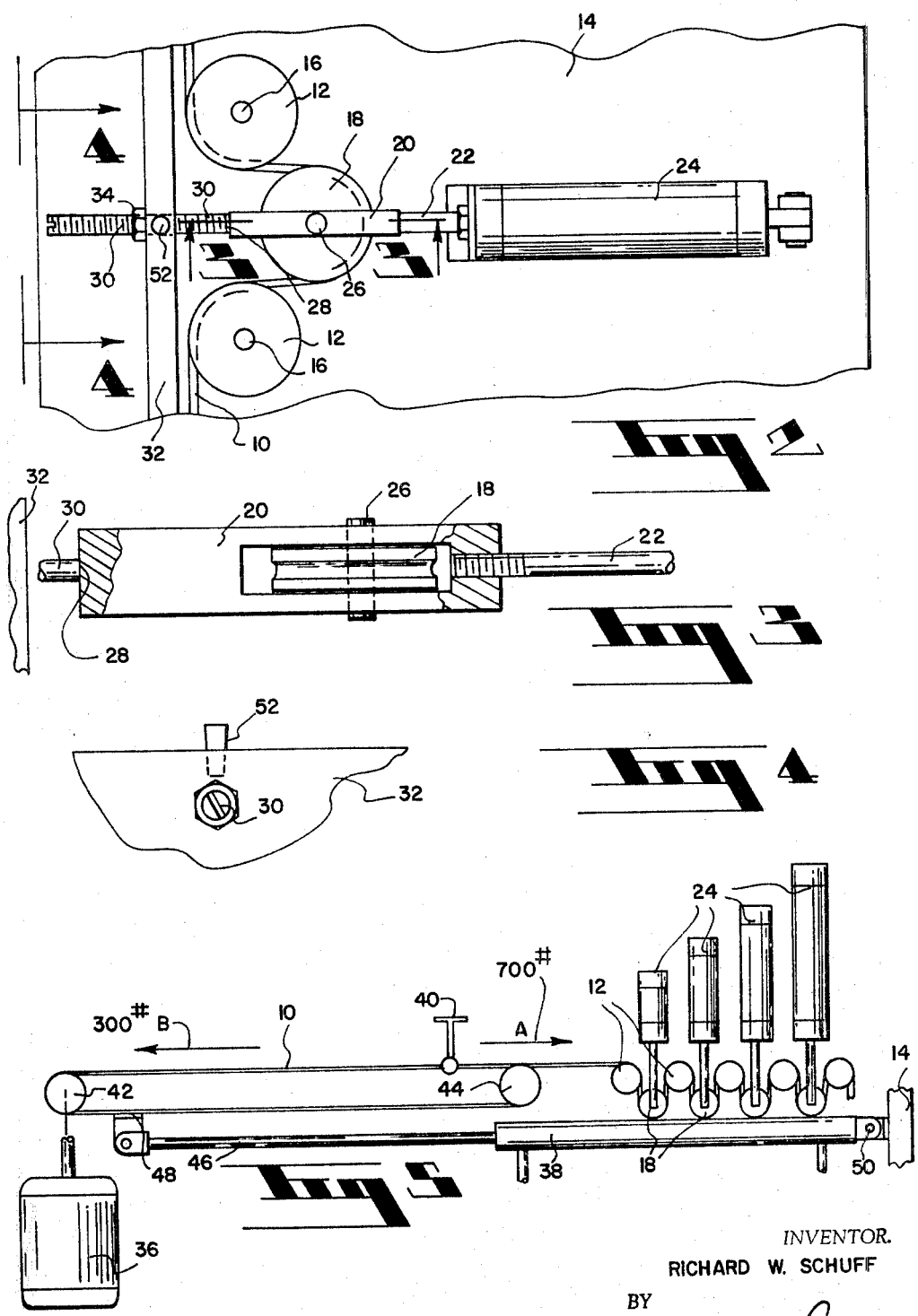
INVENTOR.
RICHARD W. SCHUFF
BY
Wm. H. Dean

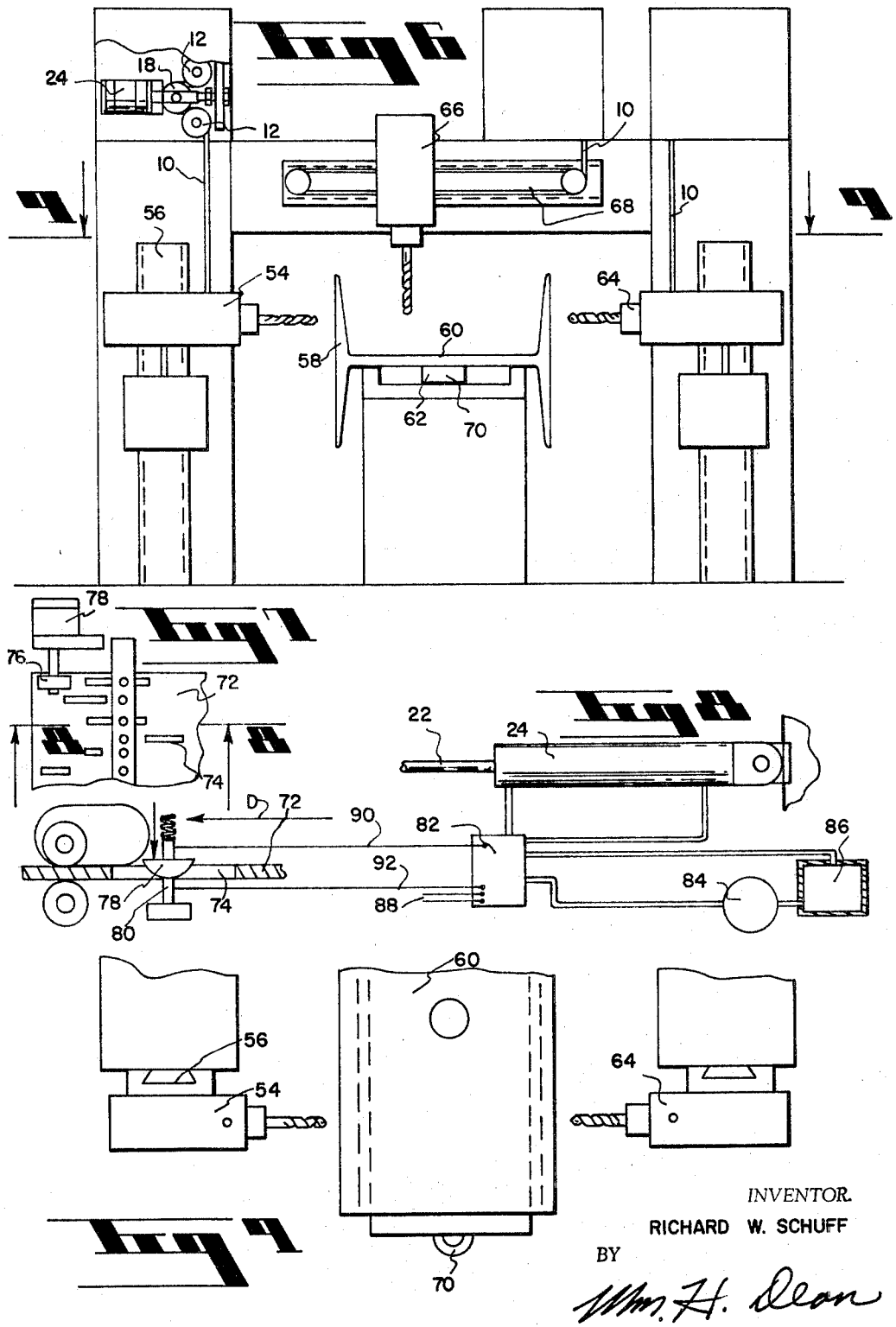

United States Patent Office 3,273,861
Patented Sept. 20, 1966

3,273,861
PRECISION POSITIONING DEVICE
Richard W. Schuff, 5026 E. Cherry Lynn Road,
Phoenix, Ariz.
Filed July 6, 1964, Ser. No. 380,583
5 Claims. (Cl. 254—189)

This invention relates to a precision positioning device, and, more particularly, to a precision positioning device which, for example, may be used to position various elements of machine tools used in production machining operations, such as the tool posts and cross feeds of lathes, the spindles of routers and mills, and/or drill presses, or the like.

Automation of precision production machine work has been accomplished in connection with various machines, such as lathes, milling machines, drill presses, and the like, by complicated electronic controls, however, many of these systems known in the art are difficult to maintain and very expensive. Additionally, many of those are not capable of being applied directly to an element of a machine to be power actuated.

It has been recognized that many complicated machining operations may be automated by programming cards to actuate switches and thereby initiate operation of various machine elements to position various cutting tools, drills, feed tables, and the like, of various machine tools, and such automation provides for uniformity and accuracy in the machining of various articles of manufacture and fabrication work, and at the same time reduces the labor cost attendant to such production.

Accordingly, it is an object of the present invention to provide a precision machining device which is composed principally of mechanical elements which are very simple to construct, operate and maintain, and which provide for a wide range of machining dimensions and tolerances applicable in the actuation of various machine elements controlled by the positioning device of the invention.

Another object of the invention is to provide a precision machining device wherein a plurality of actuating cylinders are disposed to deflect a flexible cable laterally of its axis to stop positions of the plungers of the cylinders, and whereby various cylinders may have varying strokes to provide for the actuation of the cable in accordance with various combinations of deflection magnitudes afforded by several of the cylinders.

Another object of the invention is to provide a novel precision positioning device employing a plurality of stationary pulleys between which a plurality of movable pulleys are all disposed to engage a cable, and whereby the movable pulleys are operable by fixed stroke actuators laterally of the axis of the cable to cause lateral deflection thereof and linear movement of the cable whereby an article connected to the cable may be precisely positioned in accordance with fixed stroke stops of the actuators.

Another object of the invention is to provide a novel precision positioning device employing a plurality of stationary pulleys and a plurality of movable pulleys all in series and alternately arranged in engagement with a continuous cable, and whereby the cable at one end is anchored and passes over said pulleys, and the opposite end of the cable is held by a tension maintaining device so that an article to be positioned by the cable is always precisely moved in either direction; the force of the actuators in connection with the movable pulleys being greater than the opposing tensioning device whereby fixed stop adjustments of the actuators may be the controlling factor in linear movement of the cable.

Further objects and advantages of the invention may be apparent from the following specification, appended claims and accompanying drawings in which:

FIG. 1 is a top or plan view of a cable pulley and actuator mechanism of the precision positioning device of the present invention;

FIG. 2 is an enlarged fragmentary plan sectional view similar to FIG. 1 but showing a single actuator in relation to a movable pulley operable thereby and stationary pulleys and fixed stop means for the actuator;

FIG. 3 is an enlarged sectional view taken from the line 3—3 of FIG. 2;

FIG. 4 is a fragmentary elevational view taken from the line 4—4 of FIG. 2 showing the view rotated substantially 90 degrees;

FIG. 5 is a diagrammatic view showing a few of the actuating cylinders, pulleys and cable mechanism of the invention, and showing a tensioning device applying opposing force to that applied by the cylinder actuators of the invention;

FIG. 6 is a side elevational view of a structural steel drilling machine employing the precision positioning device of the invention for precisely drilling holes in an I beam structure at various predetermined locations;

FIG. 7 is a top or plan view of a programming card and switch means of the invention used to program successive and relative actuation of some of the actuating cylinders of the invention;

FIG. 8 is a fragmentary sectional view taken from the line 8—8 of FIG. 7 and showing diagrammatically a programming card, switch contacts operable through slots therein to energize a solenoid valve in connection with each of the actuating cylinders of the precision positioning device of the invention; and FIG. 9 is a fragmentary sectional view taken from the line 9—9 of FIG. 6.

As shown in FIGS. 1 and 5 of the drawings, the precision actuating device of the present invention employs a positioning cable 10 which extends over spaced pulleys 12 rotatably mounted stationarily on a frame 14. These pulleys 12 are rotatable about stationary axles 16 which are fixed to the frame 14.

Disposed between the pulleys 12, and movable relative thereto are pulleys 18 carried in yokes 20 connected to plungers 22 of actuating cylinders 24, which are preferably hydraulic cylinders having internal plungers and stops for the plungers in a retraction direction. The yokes 20 are each provided with an axle 26 about which each pulley 18 is rotatably mounted, and inasmuch as each pulley 18 is movable relative to stationary pulleys 12, lateral deflection of the cable 18 tends to move it longitudinally in the direction of an arrow A, while movement of the pulleys 18 toward the pulleys 12, as will be hereinafter described, tends to permit the cable 10 to move in the direction of an arrow B.

Each plunger 22 is retractable in a direction of an arrow C to a conventional stop position internally of each cylinder 24, while extension of the plunger 22 is stopped by contact of an end portion 28 of each yoke 20 with an adjustable stop screw 30, which is screw threadably adjustably mounted in a stationary member 32 of the frame 14.

It will be seen that retraction of the plungers 22 places them in tension when the cable is moved in the direction of the arrow A.

With reference to FIGS. 2 and 3 of the drawings, it will be seen that the frame 14 carries an upstanding member 32 in which each stop screw 30 is screw threadably mounted and on which a jam nut 34 fixes the stop screw by being jammed against the side of the upstanding member 32. Thus, the outward stroke of each plunger 22 together with the respective yoke 20 and pulley 18 is limited in one direction by the stop screw 30 and in an opposite direction by an internal stop in each cylinder 24.

It will be seen that all of the cylinders 24 are essentially similar except for their stroke length, and that they are all arranged in series with each other so that actuation of a plurality of these cylinders will cause an accumulation of movement of the cable 10, and that such movement of the cable 10 will equal twice the amount of cylinder stroke length. Legends on the drawing in FIG. 1 indicate the stroke length, and it will be apparent by those skilled in the art that strokes all the way from .0005 to 32 inches each may cause a respective movement of the cable 10 twice the amount of the stroke, and that various combinations of cylinders may be used to attain different linear movements of the cable 10, as desired.

Referring to FIG. 5 of the drawings, it will be seen that the cylinders 24, pulleys 12, and pulleys 18 may tend to actuate the cable in a direction of the arrow A, while a constant torque motor 36, or a power cylinder 38, may tend to pull the cable 10 in a direction of the arrow B, and as an example, the force of the cylinders 24 in the direction of the arrow A may be 700 pounds, while the force of the constant torque motor 36 or the cylinder 38 may be equal to 300 pounds, so that a fixture 40 connected to the cable 10 running over pulleys 42 and 44 may be held at constant tension when moving in both directions A and B, whereby the fixture 40 may be secured to any machine element, such as a tool post, a cross feed, a drill spindle, or other elements, such as a machine table.

The power cylinder 38, being provided with a plunger 46 connected to the cable 10 by a fixture 48 and the cylinder 38, is stationarily anchored at 50 to the frame 14, or any other suitable frame, as desired.

In order to precisely set the stroke length of each cylinder 24 between its internal plunger stop and the end 28 of each screw 30 an upstanding dowel pin 52, as shown in FIGS. 2 and 4 of the drawings, may be used cooperatively with an end of the axle 26, for example, to make precision measurements of the overall stroke permitted between the internal stop for the plunger in the cylinder 24 and the end 28 of each screw 30.

As shown in FIG. 6, the precision positioning device of the invention involving cylinders 24, cable 10, and the pulleys 12 and 18 may be utilized to position an extendable spindle drill 54 on a vertical slideway gib 56 with respect to one flange 58 of an I beam 60 which is moved longitudinally by a table 62 with reference to the axes of the drill 54 and another similar drill 64 which is operable by another cable 10 in accordance with the present invention. A third cable 10 is disposed in accordance with the invention to move a third drill 66 laterally of the I beam 60 on a slide gib 68. Thus, it will be seen that the invention may also be used in connection with a fixture 70 to move the table 62 and to actuate the I beam 60 longitudinally of its axis for successively drilling holes by means of the drills 54, 64 and 66, so that in this one particular structural steel drilling machine, four units of the precision positioning device of the invention may be utilized.

With reference to FIGS. 7 and 8 of the drawings, the precision positioning device of the invention may be controlled by a card 72 having elongated perforations 74 therein patterned to bring various cylinders 24 into play, either singly or in combination at certain intervals as the card is moved longitudinally in the direction of an arrow D by a card actuator rotor 76 driven by reduction gear motor 78.

It will be understood that the card drive may be any conventional drive and that the card is driven between switch contacts 78 and 80 so that the contact 78 may pass downwardly through the respective slot 74 in the card 72 and make contact closing a circuit to a solenoid valve 82 which is a two way valve operable to energize the respective cylinder 24 with pressure fluid and to actuate its respective plunger 22. The usual pump 84 and reservoir 86 is hydraulically coupled to the solenoid valve and an electrical power supply is provided by a pair of conductors 88, while conductors 90 and 92 in connection with the respective contacts 78 and 80 serve to control operation of the respective solenoid valve 82 as the contact 78 is forced trough the slot 74 of the card and into engagement with the contact 80, thereby closing the electrical circuit to the solenoid valve 82.

It will be obvious that this control system is disclosed only by way of example, and in substantially a diagrammatic form. Any conventional means for utilizing cards as switch controls may be employed to control the solenoid valves 82, and, consequently, actuation of the plungers 22 of the cylinders 24 to move the cable 10 longitudinally of its axis a fixed amount in accordance with the fixed stop limits of actuation of each plunger 22, as hereinbefore described.

It will be obvious to those skilled in the art that various modifications of the present invention may be resorted to in a manner limited only by a just interpretation of the following claims.

I claim:
1. In a precision positioning device the combination of: a frame; a flexible cable having one end fixed with relation to said frame; a plurality of spaced first means over which said cable is engaged; a plurality of spaced second means over which said cable is engaged, said first and second means alternately disposed between each other; actuators connected to said second means and disposed to move said second means relative to said first means for causing movement of said flexible cable relative to said frame; and fixed stop means disposed precisely to limit movement of said actuators and said second means; a card having indicia portions thereon; switch means responsive to said indicia portions; said actuators operable in response to operation of said switch means.

2. In a precision tensioning device the combination of: a frame; a flexible means having one end fixed with relation to said frame; a plurality of spaced first rotating means over which said flexible means is engaged; a plurality of spaced second rotating means over which said flexible means is engaged, said first and second rotating means alternately disposed between each other; hydraulic cylinder actuators connected to said second rotating means and disposed to move said second rotating means relative to said first rotating means for causing movement of said flexible means in one direction relative to said frame; and fixed stop means disposed precisely to limit movement of said actuators and said second rotating means; constant force tensioning means disposed to exert tension on said flexible means in an opposite direction to force applied to said flexible means by said actuators; said actuators having plungers and interconnecting said frame and said second pulleys so that said plungers are in tension when said flexible means is moved in said one direction to avoid long compressive column deflection, said plungers varying in length relative to each other, said fixed stop means limiting the stroke length of said plungers, such that some of said plurality of plungers have a longer stroke than others of said plurality of plungers.

3. The invention as defined in claim 2, wherein: said tensioning means is a constant torque motor.

4. The invention as defined in claim 2, wherein: said tensioning means is a fluid powered actuator.

5. In a precision positioning device the combination of: a frame; a flexible means having one end thereof fixed with relation to said frame; a plurality of spaced first rotating means over which said flexible means is engaged; a plurality of spaced second rotating means over which said cable is engaged, said first and second rotating means alternately disposed between each other; hydraulic cylinder actuators connected to said second rotating means and disposed to move said second rotating means relative to said first rotating means for causing movement of said flexible means in one direction relative to said frame; and stop means disposed precisely to limit movement of said actuators and said second rotating means; constant force tensioning means disposed to exert tension on said flexible means in an opposite direction to force applied to said flexible means by said actuators; said actuators having plungers and interconnecting said frame and said second rotating means so that said plungers are in tension when said flexible means is moved in said one direction, said stop means limiting the stroke length of said plungers, such that some of said plungers have a longer stroke than others of said plungers and a data element having indicia portions thereon; switch means responsive to said indicia portions; said actuators operable in response to operation of said switch means.

References Cited by the Examiner

UNITED STATES PATENTS

| | | | |
|---|---|---|---|
| 2,176,979 | 10/1939 | Platz | 254—189 |
| 2,701,654 | 2/1955 | Williamsen. | |

FOREIGN PATENTS 587,846  5/1947  Great Britain.

EVON C. BLUNK, *Primary Examiner.*

H. C. HORNSBY, *Assistant Examiner.*